(12) United States Patent
Kusaka et al.

(10) Patent No.: US 8,282,720 B2
(45) Date of Patent: Oct. 9, 2012

(54) CYAN INK FOR INKJET RECORDING

(75) Inventors: Natsuko Kusaka, Tokyo (JP); Naohiro Hirose, Tokyo (JP); Hiroyuki Yasukawa, Tokyo (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 407 days.

(21) Appl. No.: 12/647,644

(22) Filed: Dec. 28, 2009

(65) Prior Publication Data

US 2010/0175584 A1    Jul. 15, 2010

(30) Foreign Application Priority Data

Jan. 13, 2009    (JP) ................. 2009-004370

(51) Int. Cl.
*C09D 11/02* (2006.01)
*C09B 47/04* (2006.01)

(52) U.S. Cl. .......... 106/31.49; 106/31.78; 540/128; 540/140

(58) Field of Classification Search ........... 106/31.49, 106/31.78; 540/128, 140
See application file for complete search history.

(56) References Cited

U.S. PATENT DOCUMENTS

| | | | |
|---|---|---|---|
| 3,094,535 A * | 6/1963 | Kenney et al. | 540/128 |
| 3,094,536 A * | 6/1963 | Kenney et al. | 540/128 |
| 4,311,775 A * | 1/1982 | Regan | 430/37 |
| 4,382,033 A * | 5/1983 | Regan | 540/128 |
| 4,632,703 A | 12/1986 | Koike et al. | |
| 5,123,960 A | 6/1992 | Shirota et al. | |
| 5,296,023 A | 3/1994 | Gregory et al. | |
| 5,614,008 A * | 3/1997 | Escano et al. | 523/161 |
| 5,686,439 A * | 11/1997 | Capraro et al. | 540/128 |
| 5,704,969 A | 1/1998 | Kanaya et al. | |
| 5,990,197 A * | 11/1999 | Escano et al. | 523/160 |
| 6,106,910 A * | 8/2000 | Tan et al. | 428/29 |
| 7,417,141 B2 * | 8/2008 | Vonwiller et al. | 540/145 |
| 7,423,145 B2 * | 9/2008 | Vonwiller et al. | 540/145 |
| 7,462,711 B2 * | 12/2008 | Takaki et al. | 540/139 |
| 7,628,849 B1 * | 12/2009 | Diehl et al. | 540/140 |
| 2011/0094413 A1 * | 4/2011 | Ganapathiappan et al. | 106/31.49 |

FOREIGN PATENT DOCUMENTS

| | | |
|---|---|---|
| JP | 61002772 | 1/1986 |
| JP | 62149758 | 7/1987 |
| JP | 62190273 | 8/1987 |
| JP | 03200883 | 9/1991 |
| JP | 2003128949 | 5/2003 |

* cited by examiner

*Primary Examiner* — Helene Klemanski
(74) *Attorney, Agent, or Firm* — Lucas & Mercanti, LLP

(57) ABSTRACT

A cyan ink for inkjet recording comprising at least one of a phthalocyanine compound represented by Formula (1) and a phthalocyanine compound represented by Formula (2), Z being represented by Formula (3):

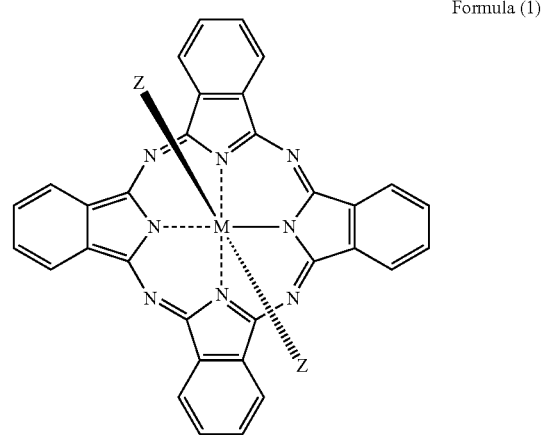

Formula (1)

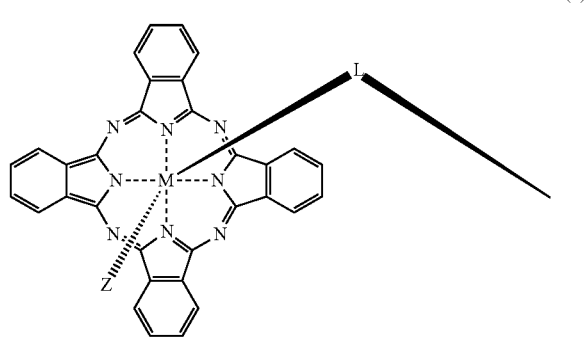

Formula (2)

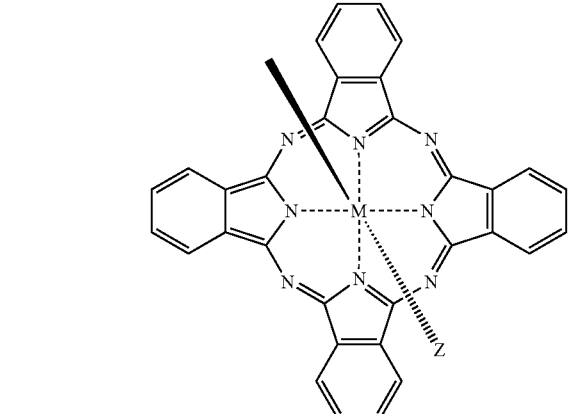

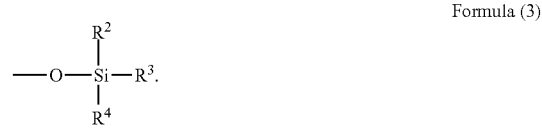

Formula (3)

12 Claims, No Drawings

CYAN INK FOR INKJET RECORDING

This application is based on Japanese Patent Application No. 2009-004370 filed on Jan. 13, 2009 in Japanese Patent Office, the entire content of which is hereby incorporated by reference.

FIELD OF THE INVENTION

The present invention relates to a cyan ink for inkjet recording, and in more detail to a cyan ink for inkjet recording which incorporates a phthalocyanine compound.

BACKGROUND OF THE INVENTION

Generally, ink is required not only to achieve excellent color reproduction, but also to enable the formation of images which excel in water fastness and light fastness. Further, in printing of inkjet recording which forms images by ejecting ink droplets onto recording media, the ink is required to exhibit more limited characteristics than those demanded for ink employed for common writing utensils such as a fountain pen or a ball-point pen. For example, the ink for inkjet recording is required to exhibit appropriate viscosity, surface tension and stability, and not to cause nozzle clogging.

Printers for inkjet recording commonly employ a yellow ink, a magenta ink, and a cyan ink, as well as arbitrarily a black ink, and create various kinds of colors via superposition of these colored inks to form color images. Each of the colored inks, employed in the printer of the inkjet recording system as described above, is required to excel in individual color reproduction and in addition, is required to excel in reproduction of red, green, and blue which are created by superposition of inks.

In general, many characteristics required for the ink for inkjet recording, as described above, are achieved via an aqueous ink composition which incorporates water-soluble dyes, and water and/or water-soluble organic solvents. Further, various characteristics of color images, such as color tone, water fastness, or light fastness depend on properties of employed water-soluble dyes, and consequently, utilization of various water-soluble dyes has been tried.

For example, Patent Documents 1-9 disclose applications of phthalocyanine compounds as a cyan colorant to form a cyan ink.

However, any of these phthalocyanine compounds provide neither high dispersion stability nor high light fastness, and a cyan ink has not been realized, which provides these characteristics.

Patent Documents
(Patent Document 1) U.S. Pat. No. 5,296,023
(Patent Document 2) U.S. Pat. No. 5,704,969
(Patent Document 3) U.S. Pat. No. 4,632,703
(Patent Document 4) U.S. Pat. No. 5,123,960
(Patent Document 5) Japanese Patent Application Publication Open to Public Inspection (hereinafter referred to as JP-A) No. 61-2772
(Patent Document 6) JP-A No. 62-149758
(Patent Document 7) JP-A No. 62-190273
(Patent Document 8) JP-A No. 2003-128949
(Patent Document 9) JP-A No. 3-200,883

SUMMARY OF THE INVENTION

In view of the foregoing, the present invention was achieved. An object of the present invention is to provide a cyan ink for inkjet recording, which exhibits high dispersion stability and high light fastness.

One of the aspects of the present invention to achieve the above object is a cyan ink for inkjet recording comprising at least one of a phthalocyanine compound represented by Formula (1) and a phthalocyanine compound represented by Formula (2):

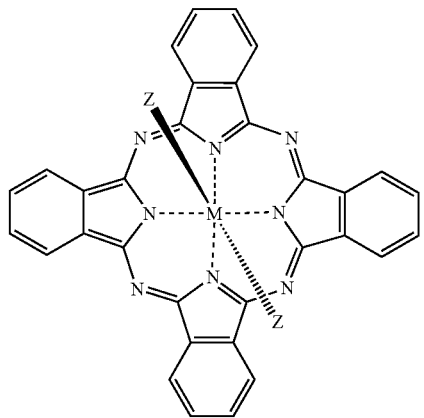

Formula (1)

wherein M represents a central metal atom comprising Si, Sn or Ge, and Z represents an organic group represented by Formula (3),

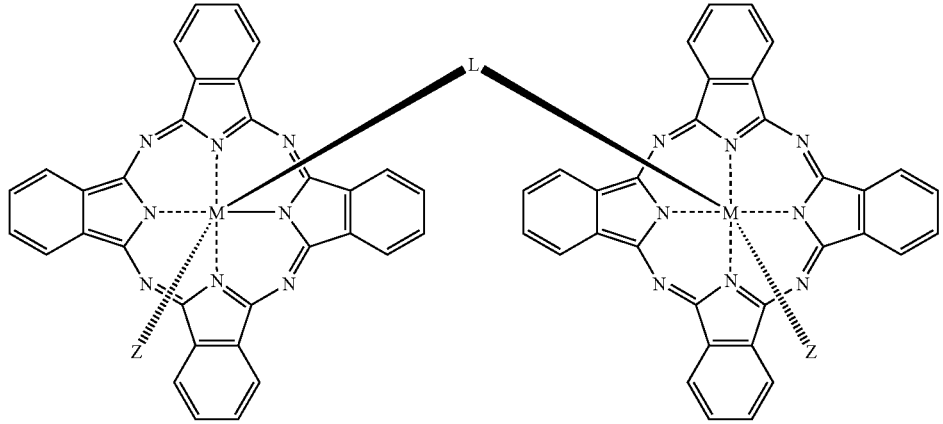

Formula (2)

wherein M represents a central metal atom comprising Si, Sn or Ge, Z represents an organic group represented by Formula (3), and L represents —O— or —OSi(R$^1$)$_2$O—, wherein R$^1$ each independently represents an alkyl group having 1-4 carbon atoms, a chlorine atom or a hydroxyl group, Formula (3)

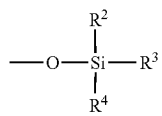

wherein R$^2$ to R$^4$ each independently represent an organic group.

DESCRIPTION OF THE PREFERRED EMBODIMENTS

According to the cyan ink for inkjet recording of the present invention, the aforesaid cyan ink for inkjet recording incorporates a phthalocyanine compound in which the central metal atom contains a specified metal and at least one substituent exists at the axial position of the aforesaid central metal atom, whereby high dispersion stability is achieved, and it is possible to form images of high brightness, and in addition, formed images exhibit high light fastness.

The present invention will now be specifically described.

The cyan ink for inkjet recording of the present invention (hereinafter also referred simply to as "the cyan ink") incorporates, as a colorant of cyan, a phthalocyanine compound represented by the aforesaid Formula (1) or (2) (hereinafter also referred to as a specified phthalocyanine compound).

The specified phthalocyanine compound is a compound which has a substituent in the perpendicular direction to the phthalocyanine ring from the central metal atom M. In addition, perpendicular direction, as used herein, means that the substituent is not on the same plane as the phthalocyanine ring. In the specified phthalocyanine compound, the substituent is not necessarily positioned accurately in the direction 90° to the aforesaid plane.

As a specified phthalocyanine compound, preferred is a compound represented by aforesaid Formula (1).

Further, in the aforesaid Formulas (1) and (2), M represents the central metal atom.

As central metal atoms in Formulas (1) and (2), exemplified are Si (a silicon atom), Ge (a germanium atom), and Sn (a tin atom), and Si is specifically preferred. The reason why Si is preferred as the central metal atom is that it provides an appropriate hue angle and exhibits sufficiently high brightness.

Further, in the aforesaid Formulas (1) and (2), Z represents a compound represented by aforesaid Formula (3).

As Z, listed are, for example, —OSi(CH$_3$)$_3$, —OSi(CH$_2$CH$_3$)$_3$, —OSi(CH$_2$CH$_2$CH$_3$)$_3$, and —OSi(C$_6$H$_5$)$_3$.

Further, in the aforesaid Formula (2), L represents —O— or —OSi(R$^1$)$_2$O—, wherein R$^1$ each independently are an alkyl group having 1-4 carbon atoms, a chlorine atom, or a hydroxyl group.

Further, R$^2$-R$^4$ in the aforesaid Formula (3) each are independently an organic group, and as R$^2$-R$^4$ in the aforesaid Formula (3), specifically preferred is, for example, an alkyl group having 1-22 carbon atoms, an aryl group having 6-18 carbon atoms, an alkoxy group having 1-22 carbon atoms, or an aryloxy group having 6-18 carbon atoms.

Of the phthalocyanine compounds represented by the aforesaid Formula (1), as specific examples in which central metal atom M is Si, listed may be those represented by following (1-1a)-(1-1d).

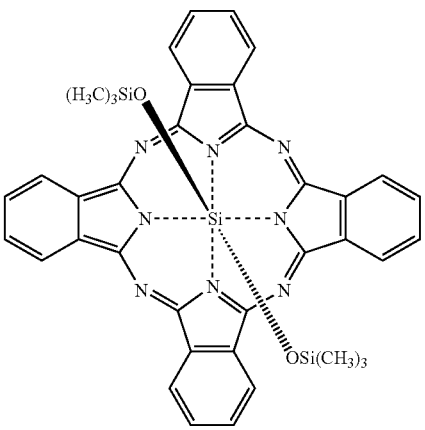

(1-1a)

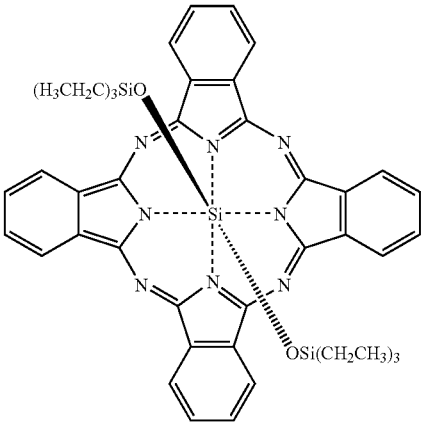

(1-1b)

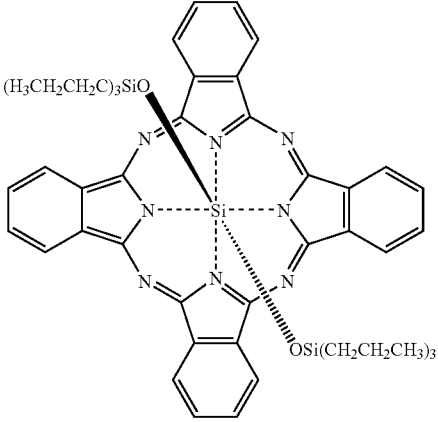

(1-1c)

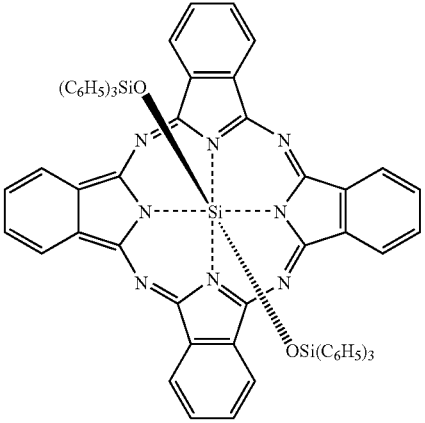

(1-1d)

Of the phthalocyanine compounds represented by the aforesaid Formula (1), as a specific example in which central metal atom M is Sn, listed may be the compound represented by following (1-2b).

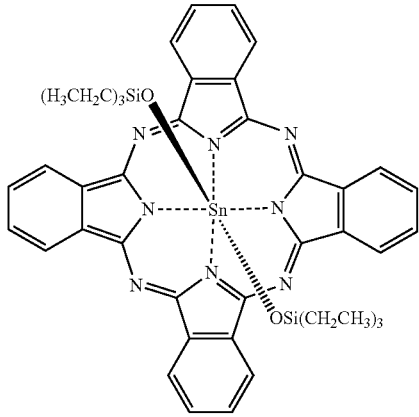

(1-2b)

Of the phthalocyanine compounds represented by the aforesaid Formula (1), as a specific example in which central metal atom M is Ge, listed may be a compound represented by following (1-3b).

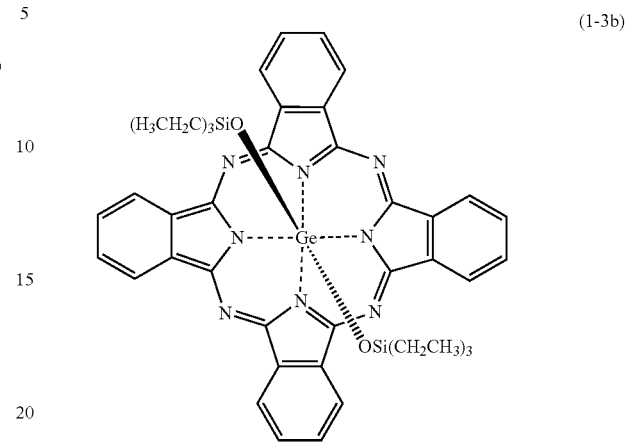

(1-3b)

As a specific example of the phthalocyanine compounds represented by the aforesaid Formula (2), listed may be a compound represented by following (2-1a).

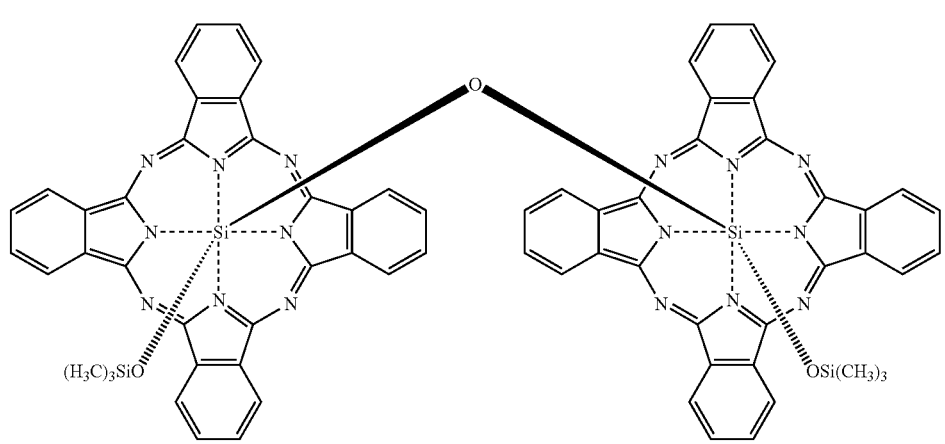

(2-1a)

The phthalocyanine compounds represented by the aforesaid Formulas (1) and (2) may be employed in combination.

The content of a cyan colorant containing a specified phthalocyanine compound is preferably 0.5-20% by mass, and is more preferably 1-10% by mass based on the mass of the ink.

As the cyan ink of the present invention, most preferable is one which incorporates the phthalocyanine compound represented by aforesaid (1-1a) in an amount of 0.5-4.0% by mass based on the mass of the ink.

(Method of Manufacturing Cyan Ink)

The cyan ink of the present invention may refer to one in which a cyan colorant composed of a specified phthalocyanine compound is dispersed into water and/or water-soluble organic solvents. Specifically, a cyan ink in which cyan colorant particles are dispersed may be prepared by uniformly mixing via a conventional method, water and/or water-soluble organic solvents, a cyan colorant composed of a specified phthalocyanine compound, and various additives which are added as needed.

When the cyan ink is prepared, it is preferable that after dissolving or dispersing a cyan colorant and additives in water and/or a water-soluble organic solvent, foreign substances are removed via microfiltration by employing a membrane filter. The pore diameter of the membrane filter to achieve microfiltration is commonly 0.1-1 μm, but is preferably 0.2-0.8 μm.

During preparation of the cyan ink, methods to disperse cyan colorant particles into water and/or water-soluble organic solvents are not specifically limited. It is possible to employ any of the homogenizers such as a sand grinder or an SC mill, each of which uses a medium, and such as CLEARMIX, which uses shearing force and cavitation force.

Further, the addition order of the cyan colorants and various additives which are added as needed to water and/or water-soluble organic solvents is not specifically limited.

As other various additives which are added as needed, listed are conventional additives such as a viscosity modifier, a surfactant, an antiseptic agent, a fungicide, a pH controlling agent, a chelating agent, an anticorrosive agent, a UV absorber, a dye dissolving agent, an anti-discoloring agent, and/or an antifoaming agent.

As water to prepare a cyan ink, it is preferable to employ ion-exchanged water or distilled water which, incorporates a minimal amount of salts.

The content of water in a cyan ink refers to the residual part of other components, whereby it depends on the content of the other components. However, the content of water is commonly 10-90% by mass, but is preferably 40-80% by mass.

As water-soluble organic solvents which are usable to prepare a cyan ink, listed are alkanols having 1-4 carbon atoms such as methanol, ethanol, n-propanol, isopropanol, n-butanol, isobutanol, secondary butanol, or tertiary butanol; carboxylic acid amides such as N,N-dimethylformamide or N,N-dimethylacetamide; heterocyclic ketones such as 2-pyrrolidone, N-methyl-2-pyrrolidone, 1,3-dimethylimidazolidine-2-one, or 1,3-dimethylhexahydropyrimid-2-one; ketones or keto-alcohols such as acetone, methyl ethyl ketone, or 2-methyl-2-hydroxypentane-4-one; cyclic ethers such as dioxane; monomers or oligomers having alkylene units, each having 1-6 carbon, atoms, or polyalkylene glycols or thioglycols such as ethylene glycol, 1,2- or 1,3-propylene glycol, 1,2- or 1,4-butylene glycol, 1,5-hexanediol, 1,6-hexylene glycol, diethylene glycol, triethylene glycol, tetraethylene glycol, dipropylene glycol, thiodiglycol, polyethylene glycol, or polypropylene glycol; polyols (triols) such as glycerin or hexane-1,2,6-triol; alkyl ethers having 1-4 carbon atoms of polyhydric alcohol such as ethylene glycol monomethyl ether, ethylene glycol monoethyl ether, ethylene glycol monoethyl ether, diethylene glycol monomethyl ether, diethylene glycol monoethyl ether, triethylene glycol monomethyl ether, or triethylene glycol monoethyl ether; and γ-butyrolactone or dimethylsulfoxide.

As preferable water-soluble organic solvents, listed are mono- or polyhydric alcohols having 3-8 carbon atoms, as well as 2-pyrrolidones which may have an alkyl group having 1-3 carbon atoms. As polyhydric alcohols, preferred are those which have 2-3 hydroxyl groups. Specific ones include isopropanol, glycerin, mono-, di-, or triethylene glycol, dipropylene glycol, 2-pyrrolidone, N-methyl-2-pyrrilidone, butanol and 1,5-hexane diol, while more preferred are isopropanol, glycerin, diethylene glycol, 2-pyrrolidone, butylcarbitol, N-methyl-2-pyrrolidone and 1,5-hexane diol.

The above water-soluble organic solvents may be employed individually or in combinations of at least two types.

As antiseptic agents, and fungicides, listed are, for example, an organic sulfur-containing compound, an organic nitrogen sulfur-containing compound, an organic halogen-containing compound, a haloallylsulfone-containing compound, an iodopropagyl-containing compound, an N-haloalkyl-containing compound, a benzothiazole-containing compound, a nitrile-containing compound, a pyridine-containing compound, an 8-oxyquinoline-containing compound, a benzothiazole-containing compound, an isothiazoline-containing compound, a dithiol-containing compound, a pyridine oxide-containing compound, a nitropropane-containing compound, an organic tin-containing compound, a phenol-containing compound, a quaternary ammonium salt-containing compound, a triazine-containing compound, a thiadiazine-containing compound, an anilide-containing compound, an adamantine-containing compound, a dithiocarbamate-containing compound, a brominated indanone-containing compound, a benzyl bromacetate-containing compound, or an inorganic salt-containing compound.

As the organic halogen compounds listed is, for example, sodium pentachlorophenol; as the pyridine oxide compound listed is, for example, sodium 2-pyridinethiol-1-oxide; as the inorganic salt compound listed is, for example, anhydrous sodium acetate; as the isothiazoline compound listed are, for example, 1,2-benzisothiazoline-3-one, 2-n-octyl-4-isothiazoline-3-one, 5-chloro-2-methyl-4-isothiazoline-3-one, 5-chloro-2-methyl-4-isothiazoline-3-one magnesium chloride, 5-chloro-2-methyl-4-isothiazoline-3-one calcium chloride, and 2-methyl-4-isothiazoline-3-one calcium chloride.

As other antiseptic agents and fungicides, listed are, sorbic acid soda and sodium benzoate such as "PROXEL GXL (S)" or "PROXEL XL-2 (S)", produced by Avecia Ltd.

The pH controlling agents are employed to enhance storage stability of the resulting ink, and as the pH controlling agents any compounds may be employed as long as they are able to control the pH of the cyan ink within the range of 6.0-11.0. Specific examples include alkanolamines such as diethanolamine or triethanolamine; alkaline metal hydroxides such as lithium hydroxide, sodium hydroxide, or potassium hydroxide; ammonium hydroxide; and alkaline metal carbonates such as lithium carbonate, sodium carbonate, or potassium carbonate.

As the chelating reagents, listed are, for example, sodium ethylenediaminetetraacetate, sodium nitrilotriacetate, sodium hydroxylethylenediaminetriacetate, sodium diethylenetriaminepentaacetate, and sodium uracildiacetate.

As the anticorrosive agents, listed are for example, acid sodium sulfite, sodium thiosulfate, ammonium thioglycolate, diisoprpylammonium nitrite, pentaerythritol tetranitrate, and dicyclohexylammonium nitrite.

As the UV absorbers, listed are, for example, benzophenone compounds, benzotriazole compounds, cinnamic acid compounds, triazine compounds, stilbene compounds, and benzoxazole compounds.

Further, it is possible to employ so-called fluorescent brightening agents which yield fluorescence via absorption of ultraviolet rays.

As the viscosity modifiers, listed are water-soluble polymer compounds such as water-soluble resins other than water-soluble organic solvents, and specific examples include polyvinyl alcohol, cellulose derivatives, polyamines, and polyimines.

The viscosity of the cyan ink of the present invention is preferably at most 30 mPa·s, but is more preferably at most 20 mPa·s.

As the dye dissolving agents, listed are, for example, urea, ε-caprolactum, and ethylene carbonate.

The anti-discoloring agents are employed to enhance storage stability of images formed via the resulting cyan ink. As the anti-discoloring agents, employed may be various organic anti-discoloring agents and metal complex anti-discoloring agents. As the organic anti-discoloring agents, listed are hydroquinones, alkoxyphenols, dialkoxyphenols, phenols, anilines, amines, indans, chromans, alkoxyanilines, and heterocycles, while as the metal complex anti-discoloring agents, listed are nickel complexes and zinc complexes.

As the surface tension controlling agents, listed are surface active agents and listed are, for example, anionic surface active agents, amphoteric surface active agents, cationic surface active agents, and nonionic surface active agents.

As the anionic surface active agents, listed are, for example, alkylsulfocarboxylic acid salts, α-olefinsulfonic acid salts, polyoxyethylene alkyl ether acetic acid salts, N-acylamino acids and salts thereof, N-acylmethyltaurine salts, rozin acid soap, castor oil sulfuric acid ester salts, lauryl alcohol sulfuric acid ester salts, alkylphenol type phosphoric acid esters, alkyl type phosphoric acid esters, alkylallylsulfonic acid salts, and diethylsulfosuccinic acid salts.

The cationic surface active agents include 2-vinylpyridine derivatives and poly4-vinylpyridine derivatives.

As the amphoteric surface active agents, listed are lauryldimethylaminoacetic acid betaine, 2-alkyl-N-carboxymethyl-N-hydroxyethylimidazolinium betaine, copra fatty acid amidopropyldimethylaminoacetic acid betaine, and polyoctyl polyaminoethylglycine, as well as imidazoline derivatives.

As the nonionic surface active agents, listed are ether based nonionic surface active agents such as polyoxyethylene nonyl phenyl ether, polyoxyethylene octyl phenyl ether, polyoxyethylene dodecyl phenyl ether, polyoxyethylene oleyl ether, polyoxyethylene lauryl ether, polyoxyethylene alkyl ether, or polyoxyalkylene alkyl ether; ester based nonionic surface active agents such as polyoxyethylene oleic acid ester, polyoxyethylene distearic acid ester, sorbitan laurate, sorbitan monostearate, sorbitan monooleate, sorbitan sesquioleate, polyoxyethylene monooleate, or polyoxyethylene stearate; acetylene glycol based nonionic surface active agents such as 2,4,7,9-tetramethyl-5-decyne-4,7-diol, 3,6-dimethyl-4-octyne-3,6-diol, 3,5-dimethyl-1-hexcyne-3-ol (for example, "SURFYNOL 104", "SURFYNOL 104 PG50", "SURFYNOL 82", SURFYNOL 465", and "OLFIN STG", produced by Nissin Chemical Industry Co., Ltd.).

These surface tension controlling agents may be employed individually or in combinations of at least two types.

The surface tension of the cyan ink of the present invention is commonly 25-70 mN/m, but is preferably 25-60 mN/m.

As the antifoaming agents, employed may be fluorine-containing compounds and silicon-containing compounds.

The cyan ink of the present invention is employed to form monochromatic cyan images. In addition, it may be employed together with a magenta ink, a yellow ink, and a black ink, when highly detailed images are to be formed, if necessary, with a light magenta ink, a blue ink, a green ink, an orange ink, a dark yellow ink, and a gray ink, whereby it is also possible to form full-color images.

In order to form full-color images, as yellow colorants of a yellow ink capable of being employed together with the cyan ink of the present invention, employed may be various ones. Listed are, for example, aryl- or heteryl-azo dyes having heterocycles such as phenols, naphthols, anilines, pyrazolone, or pyridine as a coupling component; methine dyes such as an azomethine dye, a benzylidene or a monomethine oxonol dye; and quinone dyes such as a naphthoquinone dye or an anthraquinone dye: Further, also listed may be dyes such as a chinophtharon dye, a nitro-nitroso dye, an acridine dye, or an acridinone dye.

In order to form full-color images, as magenta colorants of a magenta ink capable of being employed together with the cyan ink of the present invention, employed may be various ones. Listed are, for example, aryl-azo dyes having phenols, naphthols, and anilines as a coupling component; azomethine dyes having pyrazolones and pyrazolotriazoles as a coupling component; methine dyes such as an arylidene dye, a styryl dye, a merocyanine dye, a cyanine dye, or an oxonol dye; carbonium dyes such as a diphenylmethane dye, a triphenylmethane dye, or a xanthene dye; quinone dyes such as naphthoquinone, anthraquinone, or anthrapyridone, and condensed polycyclic dyes such as a dioxadine dye.

The above yellow colorants and/or magenta colorants may be those in which a part of the chromophor undergoes dissociation, whereby each of yellow and/or magenta is primarily formed. In such a case, the counter ion may be either an inorganic ion of alkaline metal and ammonium or an organic cation of pyridinium or a quaternary ammonium salt, and further may be a polymer cation having it in the partial structure.

Further, in order to form full-color images, as black colorants of a black ink capable of being employed together with the cyan ink of the present invention, listed may be carbon black dispersion other than disazo, trisazo and tetraazo dyes.

The cyan ink of the present invention is appropriately applied to an inkjet recording method, while it may be applied to other various recording methods such as ordinary printing, copying, marking, writing-down, drawing or stamping, in which no inkjet is employed.

An inkjet recording method is one in which by applying energy to ink, ink droplets are ejected onto an appropriate recording medium to form images.

As recording media listed are regular paper, resin coated paper, exclusive inkjet paper, glossy paper, glossy film, information transmitting sheets such as electrophotography shared paper, color filter materials, fiber, fabric (cellulose, nylon and wool), glass, metal, porcelain, and leather.

Specifically, it is preferable to employ the exclusive inkjet paper, the glossy paper, and the glossy film. These are constituted in such a manner that an ink receiving layer is arranged on a substrate composed of paper, synthetic paper, or film. The ink receiving layer is formed as follows. For example, cationic polymers are impregnated into a substrate or applied onto the same. Alternatively, it may be formed by applying, onto a substrate, hydrophilic polymers such as polyvinyl alcohol or polyvinyl pyrrolidine together with minute inorganic particles such as porous silica, alumina sol, or particular ceramics capable of absorbing colorants in ink.

Of these, it is known that the exclusive inkjet paper of such a type, that minute inorganic particles such as porous silica, alumina sol, or particular ceramics capable of absorbing colorants in ink are applied onto the surface of a substrate, is easily affected by gases in air such as ozone which exhibit oxidizing properties. Representative commercial exclusive inkjet paper as described above includes "PICTORICO" (produced by Asahi Glass Co., Ltd.), "PROFESSIONAL PHOTO PAPER", "SUPER PHOTO PAPER", and "MATT PHOTO PAPER" (all produced by Canon Inc.), "PHOTOGRAPHIC PAPER <GLOSSY>" and "PHOTO MATT PAPER (both produced by Seiko Epson Corp.), "PREMIUM GLOSSY FILM" and "PHOTO PAPER" (both produced by Hewlett Packard Japan, Ltd.), "PHOTOLIKE QP" (produced by Konica Co., Ltd.), and "HIGH QUALITY COAT PAPER" and "PHOTOGRAPHIC GLOSSY PAPER" (both produced by Sony Corp.)

As inkjet recording methods employing the cyan ink of the present invention, listed may be the following methods (1)-(4).

(1) An electrostatic suction system method: A strong electric field is applied between a nozzle and an accelerating electrode arranged in front of the nozzle, and ink, in the form of a droplet, is continuously ejected from the nozzle. While the ink droplets pass between deflecting electrodes, by giving the aforesaid deflecting electrodes printing information signals, ink droplets are ejected toward a recording medium so that the ink is fixed on the recording medium, whereby images are recorded. Alternatively, without deflecting ink droplets, by ejecting ink droplets from the nozzle onto a recording medium according to printing information signals, an image is fixed on the recording medium and recorded.

(2) A method to record images on a recording medium: Along with applying pressure to an ink solution via a small pump, by mechanically vibrating an inkjet nozzle via a quartz transducer, ink droplets are forcibly ejected from a nozzle. Ink droplets ejected from the nozzle are simultaneously charged when ejected and while the resulting ink droplets pass between deflecting electrodes, printing information signals are given to the aforesaid deflecting electrodes. By ejecting the ink droplets toward a recording medium, images are formed on the recording medium.

(3) A method to record images on a recoding medium: Pressure and printing information signals are simultaneously given to an ink solution via a piezoelectric element, and ink droplets are ejected toward a recording medium from a nozzle, whereby images are formed on the recording medium.

(4) A method to record images on a recoding medium: An ink solution is heated via minute electrodes according to printing signal information to create bubbles, and by enlarging the resulting bubbles, the ink solution is ejected toward a recording medium from a nozzle, whereby images are recorded on the recording medium.

In the inkjet recording method employing the cyan ink of the present invention, to enhance glossiness and water fastness and to improve weather resistance of formed images, minute polymer particle dispersion (polymer latex) is simultaneously employed, whereby it may be provided to the recording media. The time when the polymer latex is provided to recording media may be prior to or after ejecting the cyan ink, or it may be simultaneous. Specific providing methods include a method in which coating is previously applied onto a recording medium and the resulting coating is employed, a method in which the addition is previously carried out into the cyan ink and the resulting one is employed, and a method in which a liquid substance only composed of the polymer latex is ejected onto a recording media prior to or after ejection of the cyan ink.

(Diameter of Cyan Colorant Particle)

Acceptable average particle diameter (D) of cyan colorant particles, dispersed into the cyan ink, may be one which makes it possible to pass through a membrane filter to achieve microfiltration, and is, for example, preferably 0.1-1 μm, but is more preferably 0.2-0.8 μm. It is possible to control the above average particle diameter (D) by regulating dispersion conditions during dispersion of specified phthalocyanine compounds.

By regulating the average particle diameter (D) of cyan colorant particles dispersed into the cyan ink within the above range, the resulting cyan ink is simultaneously provided with targeted tinting strength and high image quality, whereby it is possible to form high quality images under high tinting strength.

The average particle diameter (D) of cyan colorant particles dispersed into organic solvents refers to the number average particle diameter determined via laser Doppler detection system electrophoresis (ELS). Specifically, the average particle diameter (D) of the cyan colorant particles is designated as the value determined by employing a zeta potential particle size distribution meter "DELSA™ NANO Cj" (produced by Beckmann Coulter, Inc.).

By employing the cyan ink described as above, since the aforesaid cyan ink for inkjet recording incorporates phthalocyanine compounds in which the central metal atom is composed of the specified metal, and which have a substituent in the axial position, high dispersion stability is achieved and it is possible to form images of high brightness compared to the cyan ink employing conventional phthalocyanine. In addition, formed images exhibit high light fastness.

EXAMPLES

Specific examples of the present invention will now be described, however the present invention is not limited thereto.

Example 1

Cyan Ink Preparation Example 1

Following Composition A were blended and stirred via an SC mill, followed by filtration with a membrane filter of a pore diameter of 0.45 μm, whereby Cyan Ink (1) was prepared.

(Composition A)

| | |
|---|---|
| Phthalocyanine Compound (1-1a) | 4.5% by mass |
| 2-Methyl-2-n-propyl-1,3-propanediol | 4.5% by mass |
| 1,5-Hexanediol | 10.0% by mass |
| Triethylene glycol | 10.0% by mass |
| "PROXEL GXL(D)" (produced by Avecia Ltd.) | 0.1% by mass |

Examples 2-4

Cyan Ink Preparation Examples 2-4

Cyan Inks (2)-(4) were prepared in the same manner as Cyan Ink Preparation Example 1, except that Phthalocyanine Compound (1-1a) was replaced with each of Phthalocyanine Compound (1-1b), Phthalocyanine Compound (1-1c), and Phthalocyanine Compound (1-1d).

Example 5

Cyan Ink Preparation Example 5

Cyan Ink (5) was prepared in the same manner as Cyan Ink Preparation Example 1, except that Composition A were replaced with the following Composition B.

(Composition B)

| | |
|---|---|
| Phthalocyanine Compound (1-2b) | 4.2% by mass |
| 2-Methyl-2-n-propyl-1,3-propanediol | 3.8% by mass |
| 1,5-Hexanediol | 10.0% by mass |
| 2-Pyrrolidone | 5.0% by mass |
| Ion-exchanged water | 77.0% by mass |

Example 6

Cyan Ink Preparation Example 6

Cyan Ink (6) was prepared in the same manner as Cyan Ink Preparation Example 1, except that Phthalocyanine Compound (1-1a) was replaced with Phthalocyanine Compound (1-3b).

Example 7

Cyan Ink Preparation Examples 7

Cyan Ink (7) was prepared in the same manner as Cyan Ink Preparation Example 5, except that Phthalocyanine Compound (1-2b) was replaced with Phthalocyanine Compound (2-1a).

Comparative Example 1

Comparative Cyan Ink Preparation Example 1

Initially, 6.6 parts by mass of polyoxyethylene styrene phenyl ether, "NOIGEN EA-197" (produced by Dai-ichi Kogyo Seiyaku Co., Ltd.) of an HLB value of 17.5, which is a nonionic surfactant, were dissolved in 73.4 parts by mass of ion-exchanged water. Subsequently, 20.0 parts by mass of Phthalocyanine Compound (x) were mixed with the above solution. After sufficient wetting, the resulting mixture was dispersed over two hours at 2,000 rpm via a wet system homogenizer, "DAINO MILL KDL Type A" (produced by WAB Co.) filled with diameter 0.5 mm zirconia beads, whereby primary pigment dispersion was prepared.

At the same time, 10.0 parts by mass of α-olefin-maleic anhydride copolymer (III) "T-YP112" (produced by Seiko PMC Corp.) (olefin chain: the number of carbon atoms of 20-24, an acid value of 190 mg·KOH/g, and a weight average molecular weight of 10,000), 17.34 parts by mass of an aqueous 1N LiOH solution (1.2 times the amount of the acid value), and 72.66 parts by mass of ion-exchanged water were mixed. After dissolving α-olefin-maleic anhydride copolymer (III), a small amount of insoluble matter was removed via filtration employing a filter of an average pore diameter of 5 μm, whereby a polymer dispersion stabilizing agent solution was prepared.

Subsequently, 20.0 parts by mass of the resulting polymer dispersion stabilizing solution were added to the aforesaid primary pigment dispersion, followed by sufficient agitation, whereby Comparative Cyan Ink (8) was prepared. The average particle diameter (D) of the resulting Cyan Ink (8) was determined, resulting in 83 nm. Determination of the average particle diameter (D) was carried out by employing "UPA-EX150", produced by Micro Track Co., Ltd.

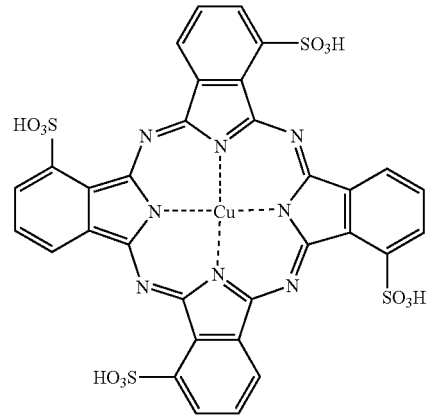

(x)

Comparative Example 2

Comparative Cyan Ink Preparation Example 2

After blending, agitating, and dissolving the following Composition C, pressure filtration was carried out by employing a microfilter of a pore size of 0.2 μm, whereby Comparative Cyan Ink (9) was prepared.

(Composition C)

| | |
|---|---|
| Phthalocyanine Compound (y) | 3 parts by mass |
| Glycerin | 10 parts by mass |
| Diethylene glycol | 10 parts by mass |
| Acetylene glycol ethylene oxide adduct "ACETYLENOL EH" (produced by Kawaken Fine Chemicals Co., Ltd.) | 1 part by mass |
| Ion-exchanged water | 76 parts by mass |

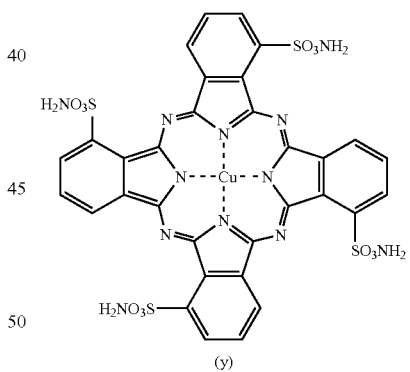

(y)

Above Cyan Inks (1)-(9) were evaluated for following (1)-(6). Table 1 shows the results.

(1) Dispersion Stability

Number average particle diameter (D) of each of Cyan Inks (1)-(9) was determined by employing "DELSA™ NANO C" (produced by Beckmann Coulter Inc.). Thereafter, a stability test was carried out in such a manner that each ink was stored in a tightly sealed state at 50° C. for one week and number average particle diameter (D) was determined in the same manner as above. Subsequently, the variation ratio was calculated based on the following Mathematical Formula (1) and evaluated. A variation ratio of less than 20% was judged excellent, the variation ratio of 20% or more but less than 40% was judged good, and the variation ratio of 40% or more was judged poor.

In the following Mathematical Formula (1), D (before) is number average particle diameter (D) before the stability test, while D (after) is number average particle diameter (D) after the stability test.

$$\text{Variation Ratio (\%)} = \{[D(\text{after}) - D(\text{before})]/D(\text{before})\} \times 100 \quad \text{Mathematical Formula (1)}$$

(2) Ejection Stability

Each of Cyan Inks (1)-(9) was placed in an ink cartridge and the resulting cartridge was loaded in an inkjet printer, "PIXUS IP2600" (produced by Canon Inc.). After printing 10 sheets of an image having a pixel ratio of 15%, the printer was allowed to stand in an ambience of high temperature and high humidity (35° C. temperature/85% relative humidity) for one week. Subsequently, printing was carried out in an ambience of normal temperature and normal humidity (20° C. temperature/50% relative humidity). Printing was carried out until no printing defects were observed. The number of the sheets necessary to obtain a sheet having no printing defect was evaluated. When no defect was observed from the first printing sheet, the ejection stability was evaluated to be excellent.

(3) Printing Quality (Ink Bleeding)

Each of Cyan Inks (1)-(9) was placed in an ink cartridge, and the resulting cartridge was loaded in an inkjet printer, "PIXUS IP2600" (produced by Canon Inc.). Subsequently, images were formed on common high quality paper (which is employed for electrophotography: weight of 63 g/m$^2$), which is not a special sheet only for inkjet printing. Formed character images were observed visually and by employing a 60× power microscope, and evaluated in terms of the following evaluation criteria.

—Evaluation Criteria—

A (excellent): no bleeding was noted by both visual observation and microscopic observation B (good): bleeding was not noted by visual observation but noted via microscopic observation C (poor): bleeding was noted by both visual observation and microscopic observation (4) Printing Quality (Ink Drying Properties)

Each of Cyan Inks (1)-(9) was placed in an ink cartridge, and the resulting cartridge was loaded in an inkjet printer, "PIXUS IP2600" (produced by Canon Inc.). Subsequently, solid images at a pixel ratio of 100% were formed on common high quality paper (which is employed for electrophotography: weight of 63 g/m$^2$), which was not a special sheet only for inkjet printing. Another recording paper which had not been printed was piled on top of the formed image sheet, 5 seconds after the image formation. Subsequently carried out was an ink transfer test to observe the presence of ink transfer onto the recording paper which had not been printed, and evaluation was carried out based on the following evaluation criteria.

—Evaluation Criteria—

A (excellent): in the ink transfer test 5 seconds after image formation, no ink was transferred B (good): in the ink transfer test 5 seconds after image formation, ink was transferred, but in the ink transfer test 60 seconds after image formation, no ink was transferred C (poor): even in the ink test 60 seconds after image formation, ink was transferred (5) Water Fastness Each of Cyan Inks (1)-(9) was placed in an ink cartridge, and the resulting cartridge was loaded in an inkjet printer, "PIXUS IP2600" (produced by Canon Inc.). Subsequently, character images at a pixel ratio of 15% were formed on common high quality paper (which is employed for electrophotography: a weight of 63 g/m$^2$), which was not a special sheet only for inkjet printing. A drop of water was dripped on the formed character image. The result was visually observed and evaluation was carried out based on the following evaluation criteria.

—Evaluation Criteria—

A (excellent): in the printed portion, on which a drop of water was dripped, no change was observed B (good): at the periphery of the printed portion, on which a drop of water was dripped, a water mark was formed C (poor): the periphery of the printed portion, on which a drop of water was dripped, resulted in bleeding (6) Light Fastness <Residual Dye Ratio>

Each of Cyan Inks (1)-(9) was placed in an ink cartridge, and the resulting cartridge was loaded in an inkjet printer, "PIXUS IP2600" (produced by Canon Inc.). Subsequently, solid images at a pixel ratio of 100% were formed on common high quality paper (which is employed for electrophotography: weight of 63 g/m$^2$), which was not a special sheet only for inkjet printing. After determining the chromaticity of formed solid images via "MACBETH COLOR EYE 7000" (produced by Macbeth Co.), the solid image was subjected to an exposure test in such a manner that in an ambience of a temperature of 70° C., a relative humidity of 50%, and a black panel temperature of 89° C., exposure to light similar to outdoor sun light was carried out at xenon radiation illuminance of 0.35 W/m$^2$ (340 nm) for 24 hours, employing "WEATHER-O-METER Ci35AW" (produced by Atlas Co.), and the chromaticity was determined in the same manner as above. The residual dye ratio was calculated based on the following Mathematical Formula (2), followed by evaluation. The residual dye ratio of at least 80% was evaluated to be excellent, the residual dye ratio of at least 50%—less than 80% was evaluated to be good, while the residual dye ratio of less than 50% was evaluated to be poor.

In the following Mathematical Formula (2), C (before) is the chromaticity before the exposure test, while C (after) is the chromaticity after the exposure test.

$$\text{Residual dye ratio (\%)} = \{C(\text{after})/C(\text{before})\} \times 100 \quad \text{Mathematical Formula (2)}$$

<Visual Evaluation>

Further, images after the exposure test were visually observed and evaluation was based on the following evaluation criteria. At least 3 of the following evaluation criteria was considered to be at a level of no practical problem.

—Evaluation Criteria—

5: no change was felt compared to the image before the exposure test

4: lower density was partially felt compared to the image before the exposure test 3: lower density was entirely felt compared to the image before the exposure test
2: significantly lower density was felt compared to the image before the exposure test
1: no presence of residual dyes was felt compared to the image before the exposure test

TABLE 1

| | | Phthalo- | | | Evaluation Results | | | | Light fastness | |
| | Ink No. | cyanine Compound | Dispersion Stability | Ejection Stability | Ink Bleeding | Ink Drying Properties | Water fastness | Residual Dye Ratio | Visual Evaluation |
|---|---|---|---|---|---|---|---|---|---|
| Example 1 | 1 | 1-1a | 5% | first sheet | A | A | A | 99% | 5 |
| Example 2 | 2 | 1-1b | 10% | first sheet | A | B | A | 78% | 4 |
| Example 3 | 3 | 1-1c | 13% | first sheet | B | B | B | 72% | 4 |
| Example 4 | 4 | 1-1d | 15% | first sheet | B | A | A | 82% | 4 |
| Example 5 | 5 | 1-2b | 20% | first sheet | B | B | A | 99% | 5 |
| Example 6 | 6 | 1-3b | 29% | first sheet | B | A | B | 81% | 5 |
| Example 7 | 7 | 2-1a | 17% | first sheet | B | A | A | 84% | 4 |
| Comp. 1 | 8 | x | 28% | third sheet | C | C | C | 43% | 2 |
| Comp. 2 | 9 | y | 20% | third sheet | C | C | C | 20% | 2 |

Comp.: Comparative Example

As described above, it was confirmed that by employing Cyan Inks (1)-(7) according to Examples 1-7, high quality was achieved so that sufficient stability was realized during storage, the ejection stability was also realized, and further, sufficient light fastness of printed images was realized.

What is claimed is:

1. A cyan ink for inkjet recording comprising a phthalocyanine compound represented by Formula (1) or a phthalocyanine compound represented by Formula (2):

Formula (1)

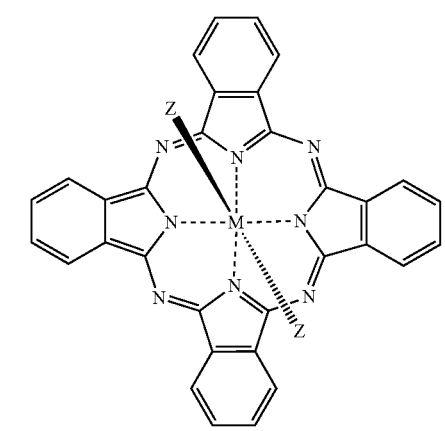

Formula (2)

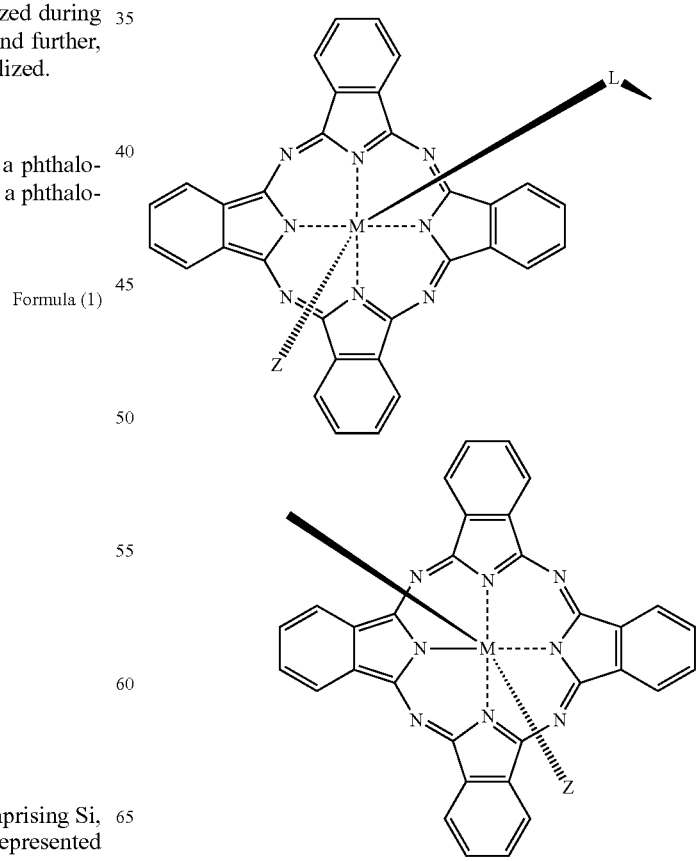

wherein M represents a central metal atom comprising Si, Sn or Ge, and Z represents an organic group represented by Formula (3), wherein M represents a central metal atom comprising Si, Sn or Ge, Z represents an organic group represented by Formula (3), and L represents —O— or —OSi(R$^1$)$_2$O—, wherein R$^1$ each independently represents an alkyl group having 1-4 carbon atoms, a chlorine atom or a hydroxyl group,

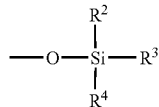

Formula (3)

wherein R$^2$ to R$^4$ each independently represent an organic group.

2. The cyan ink of claim 1 comprising 0.5 to 20% by mass of the phthalocyanine compound represented by Formula (1).

3. The cyan ink of claim 1 comprising 1 to 10% by mass of the phthalocyanine compound represented by Formula (1).

4. The cyan ink of claim 1 comprising phthalocyanine compound (1-1a):

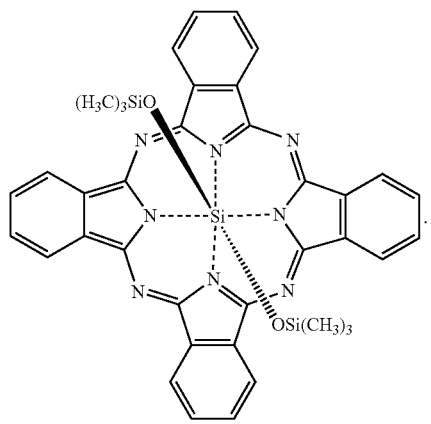

(1-1a)

5. The cyan ink of claim 4 comprising 0.5 to 4.0% by mass of the phthalocyanine compound represented by Formula (1).

6. The cyan ink of claim 1 comprising phthalocyanine compound (1-1b):

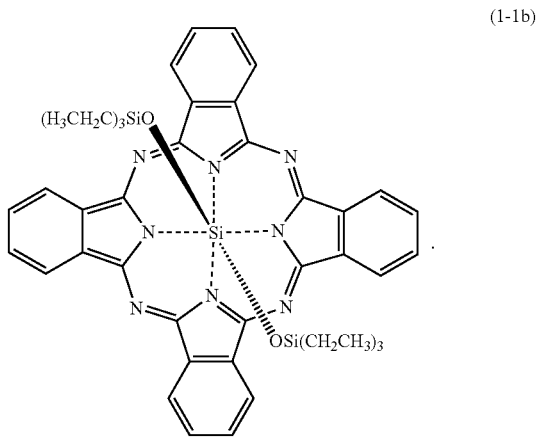

(1-1b)

7. The cyan ink of claim 1 comprising the phthalocyanine compound represented by Formula (1) and 2-methyl pyrrolidone.

8. The cyan ink of claim 1, wherein R$^2$ to R$^4$ in Formula (3) are each independently selected from the group consisting of an alkyl group having 1 to 22 carbon atoms, an aryl group having 6 to 18 carbon atoms, an alkoxy group having 1 to 22 carbon atoms and an aryloxy group having 6 to 18 carbon atoms.

9. The cyan ink of claim 1, wherein the central atom M of Formula (1) is Si.

10. The cyan ink of claim 1, wherein the central atom M of Formula (1) is Ge.

11. The cyan ink of claim 1, wherein the central atoms M of Formula (2) are Si.

12. The cyan ink of claim 1, wherein the central atoms M of Formula (2) are Ge.

* * * * *